(12) United States Patent
Amano

(10) Patent No.: US 10,027,532 B2
(45) Date of Patent: Jul. 17, 2018

(54) STORAGE CONTROL APPARATUS AND STORAGE CONTROL METHOD

(71) Applicant: FUJITSU LIMITED, Kawasaki-shi, Kanagawa (JP)

(72) Inventor: Kazuhiko Amano, Kunitachi (JP)

(73) Assignee: FUJITSU LIMITED, Kawasaki (JP)

( * ) Notice: Subject to any disclaimer, the term of this patent is extended or adjusted under 35 U.S.C. 154(b) by 244 days.

(21) Appl. No.: 15/185,190

(22) Filed: Jun. 17, 2016

(65) Prior Publication Data

US 2016/0380804 A1    Dec. 29, 2016

(30) Foreign Application Priority Data

Jun. 24, 2015   (JP) ................................. 2015-126890

(51) Int. Cl.
| G06F 15/173 | (2006.01) |
| H04L 12/24 | (2006.01) |
| H04L 12/707 | (2013.01) |
| H04L 12/703 | (2013.01) |
| H04L 12/26 | (2006.01) |

(52) U.S. Cl.
CPC ...... *H04L 41/0672* (2013.01); *H04L 43/0823* (2013.01); *H04L 45/22* (2013.01); *H04L 45/28* (2013.01)

(58) Field of Classification Search
CPC . H04L 41/0672; H04L 43/0823; H04L 45/22; H04L 45/28
See application file for complete search history.

(56) References Cited

U.S. PATENT DOCUMENTS

| 6,718,383 | B1* | 4/2004 | Hebert | H04L 45/22 709/221 |
| 8,909,980 | B1* | 12/2014 | Lewis | G06F 11/00 714/4.11 |
| 8,949,656 | B1* | 2/2015 | Ninan | G06F 11/2005 714/4.1 |
| 2004/0085894 | A1* | 5/2004 | Wang | H04L 41/0663 370/216 |
| 2005/0177770 | A1* | 8/2005 | Coatney | G06F 11/2092 714/15 |
| 2009/0245261 | A1* | 10/2009 | Khan | H04L 12/4641 370/395.53 |

(Continued)

FOREIGN PATENT DOCUMENTS

| JP | 2002-169659 | 6/2002 |
| JP | 2008-204238 | 9/2008 |
| JP | 2008-217202 | 9/2008 |

*Primary Examiner* — Jonathan A Bui
(74) *Attorney, Agent, or Firm* — Fujitsu Patent Center

(57) ABSTRACT

A storage system includes a storage apparatus and a server apparatus. The storage apparatus includes a switching unit, a first storage control apparatus, and a second storage control apparatus. The first storage control apparatus includes a storage unit and a control unit. The storage unit stores path connection information. On detecting a restart condition of the second storage control apparatus, the control unit switches a second port from being connected at the switching unit to the second storage control apparatus on a second path to being connected to the first storage control apparatus on a third path, based on the path connection information, and then instructs the second storage control apparatus to restart.

8 Claims, 15 Drawing Sheets

(56) References Cited

U.S. PATENT DOCUMENTS

| | | | |
|---|---|---|---|
| 2010/0165832 A1* | 7/2010 | Kini, Sr. | H04L 12/2859 |
| | | | 370/217 |
| 2011/0231604 A1* | 9/2011 | Taguchi | G06F 3/0613 |
| | | | 711/114 |
| 2015/0263970 A1* | 9/2015 | Macchiano | H04L 45/22 |
| | | | 709/223 |
| 2016/0380804 A1* | 12/2016 | Amano | H04L 45/22 |
| | | | 709/239 |

* cited by examiner

300 ZONING SETTINGS TABLE

| ZONE ID | HOST PORT | SW PORT (HOST SIDE) | SW PORTS (CONTROLLER MODULE SIDE) | FAILOVER PORTS | | |
|---|---|---|---|---|---|---|
| | | | | 1 | 2 | ... |
| 10 | HBA-1 | Port-1 | Port-5, CH-11 | Port-7, CH-21 | Port-8, CH-22 | — |
| 20 | HBA-2 | Port-2 | Port-7, CH-21 | Port-5, CH-11 | Port-6, CH-12 | — |
| 30 | HBA-3 | Port-3 | Port-6, CH-12 | Port-8, CH-22 | Port-7, CH-21 | — |
| 40 | HBA-4 | Port-4 | Port-8, CH-22 | Port-6, CH-12 | Port-5, CH-11 | — |

FIG. 12

STORAGE CONTROL APPARATUS AND STORAGE CONTROL METHOD

CROSS-REFERENCE TO RELATED APPLICATION

This application is based upon and claims the benefit of priority of the prior Japanese Patent Application No. 2015-126890, filed on Jun. 24, 2015, the entire contents of which are incorporated herein by reference.

FIELD

The present embodiments discussed herein are related to a storage control apparatus and a storage control method.

BACKGROUND

In a storage apparatus in which storage control apparatuses are redundantly provided (such apparatuses are hereinafter referred to as "redundant modules"), when a problem has occurred at a redundant module, it is sometimes possible to clear the error and recover from the problem by restarting the redundant module. By doing so, it is possible for the storage apparatus to maintain its functionality without the redundant module where the problem occurred needing to be replaced.

On detecting a broken path including a redundant module where an error has occurred, a server apparatus cuts off the path (or "error path") and switches to a failover path. By doing so, it is possible for the server apparatus to continue accessing the storage apparatus, though there may be some drop in performance due to the loss of one path. When the redundant module where the error occurred has recovered by restarting, the server apparatus can recover from the error that occurred at the redundant module by re-establishing the path that was cut off.

See, for example, the following documents:
Japanese Laid-open Patent Publication No. 2002-169659
Japanese Laid-open Patent Publication No. 2008-204238
Japanese Laid-open Patent Publication No. 2008-217202

However, a server apparatus that accesses storage apparatuses like that described above needs to have a function that switches to a failover path. Since the detecting of a broken path is also carried out by the server apparatus, there is a delay in detecting a broken path, which may cause a drop in responsiveness, which is one of system requirements. On the other hand, erroneous detection of a broken path may destabilize the system. Depending on the system, a system engineer may be requested to make operations to re-establish a path that has been temporarily cut off.

SUMMARY

According to one aspect, there is provided a storage control apparatus that connects on a first path to a first port of a server apparatus via a switch and shares a load of access control from the server apparatus to a storage apparatus with a redundant storage control apparatus that connects on a second path to a second port of the server apparatus via the switch, the storage control apparatus including: a memory storing path connection information relating to a connection between the server apparatus and the storage control apparatus at the switch and a connection between the server apparatus and the redundant storage control apparatus at the switch; and a processor configured to perform a procedure including: switching, when a restart condition of the redundant storage control apparatus has been detected, the second port from being connected at the switch to the redundant storage control apparatus that is connected on the second path to being connected to the storage control apparatus that is connected on a third path based on the path connection information, and then instructing the redundant storage control apparatus to restart.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 depicts one example of a zoning settings table according to the second embodiment.

DESCRIPTION OF EMBODIMENTS

Figure 1:
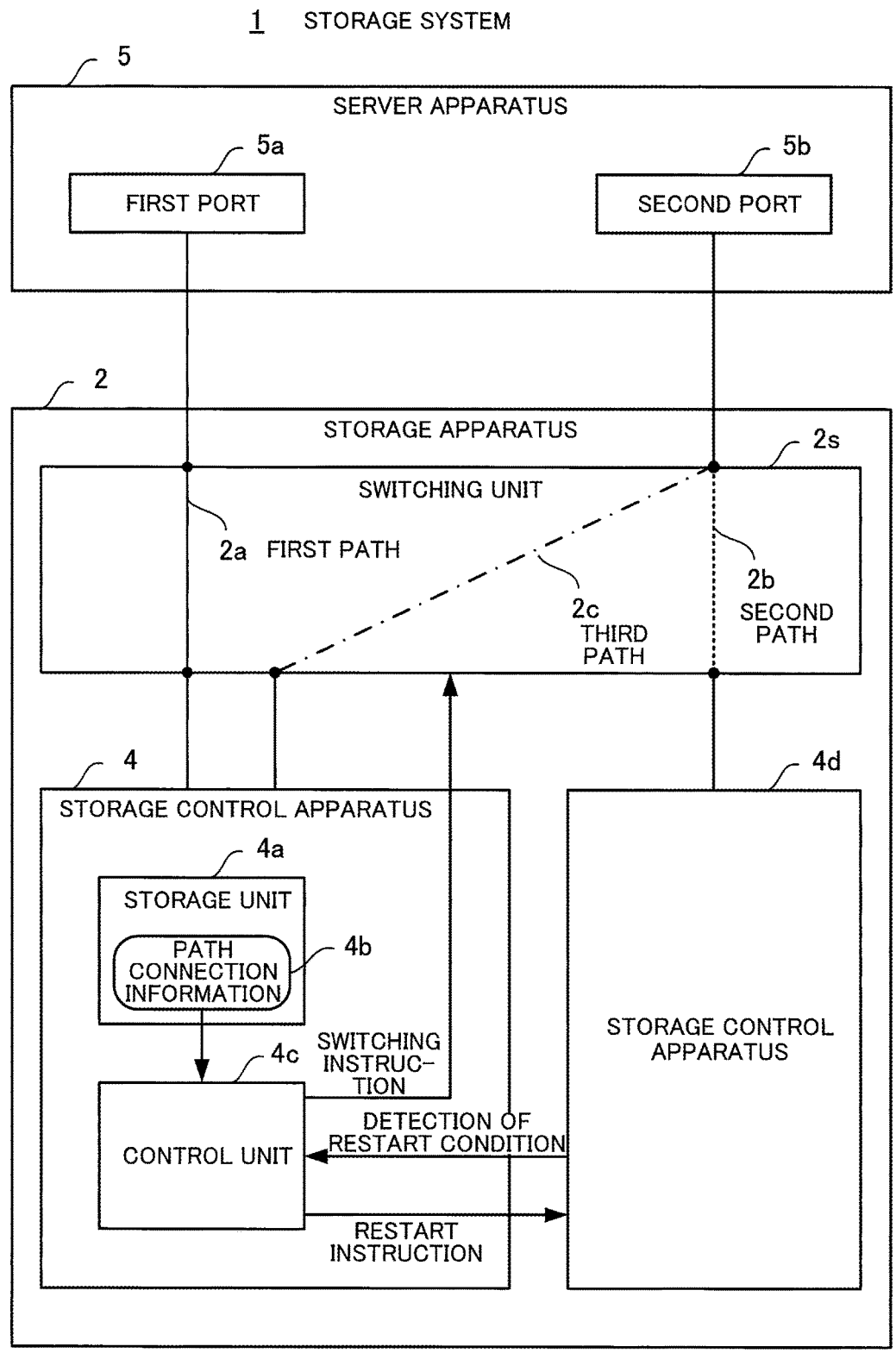
FIG. 1 depicts an example configuration of a storage system according to a first embodiment.

Several embodiments will be described below with reference to the accompanying drawings, wherein like reference numerals refer to like elements throughout. Note that the following embodiments can be implemented in combination as appropriate.

First Embodiment

First, a storage system according to a first embodiment will be described with reference to FIG. 1. FIG. 1 depicts an example configuration of a storage system according to the first embodiment.

The storage system 1 includes a storage apparatus 2 and a server apparatus (external apparatus) 5 connected to the storage apparatus 2. The storage apparatus 2 controls one or more storage devices in accordance with access requests received from the server apparatus 5. As examples, the storage devices may be SSDs (Solid State Drives) and/or HDDs (Hard Disk Drives).

The storage apparatus 2 includes a switching unit 2s and storage control apparatuses 4 and 4d. Note that instead of being included in the storage apparatus 2, the switching unit 2s may be externally connected to the storage apparatus 2. The storage control apparatuses 4 and 4d are redundantly provided in the storage apparatus 2. The storage control apparatuses 4 and 4d share the load of access control from the server apparatus 5 to the storage devices, and when a failure occurs for one storage control apparatus, the other storage control apparatus takes charge of access control from the server apparatus 5 to the storage devices. Accordingly, from the viewpoint of one of the storage control apparatuses 4 and 4d, the other storage control apparatus is redundant.

The switching unit 2s switches paths between the server apparatus 5 and the storage control apparatuses 4 and 4d. As one example, the switching unit 2s connects a first port 5a of the server apparatus 5 and the storage control apparatus 4 on a first path 2a and connects a second port 5b of the server apparatus 5 and the storage control apparatus 4d on a second path 2b. The switching unit 2s is capable of switching the second port 5b from being connected to the storage control apparatus 4d on the second path 2b to being connected to the storage control apparatus 4 on a third path 2c.

The storage control apparatus 4 includes a storage unit 4a and a control unit 4c. The storage unit 4a stores path connection information 4b. The path connection information 4b is information relating to the connections between the server apparatus 5 and the storage control apparatuses 4 and 4d at the switching unit 2s. For example, the path connection information 4b includes a connection relationship that connects the first port 5a of the server apparatus 5 and the storage control apparatus 4 on the first path 2a and a connection relationship that connects the second port 5b of the server apparatus 5 and the storage control apparatus 4d on the second path 2b. The storage unit 4a is a RAM (Random Access Memory), for example.

The control unit 4c is capable of detecting a restart condition of the storage control apparatus 4d. As examples, the restart condition may be detection of a failure that results in the necessity to restart the storage control apparatus 4d (such "detection" may include receiving notification from the storage control apparatus 4d) or an update that involves restarting the storage control apparatus 4d (such as an update to the firmware of the storage control apparatus 4d).

On detecting the restart condition of the storage control apparatus 4d, the control unit 4c switches the second port 5b of the switching unit 2s based on the path connection information 4b from being connected to the storage control apparatus 4d on the second path 2b to the storage control apparatus 4 connected to the third path 2c. After switching the second port 5b from being connected to the storage control apparatus 4d to being connected to the storage control apparatus 4, the control unit 4c instructs the storage control apparatus 4d to restart.

Note that the storage control apparatus 4d has the same configuration as the storage control apparatus 4. The storage control apparatus 4d is capable, upon detecting a restart condition of the storage control apparatus 4, of instructing the switching unit 2s to switch the path connection and instructing the storage control apparatus 4 to restart.

When the storage control apparatus 4 described above is used, the server apparatus 5 does not need to have a function for switching to a failover path. Also, the server apparatus 5 does not need to carry out detection of broken paths for the storage control apparatuses 4 and 4d. Accordingly, the storage system 1 is capable of avoiding a drop in responsiveness, which is one of system requirements, due to a delay in detecting a broken path. The storage system 1 is also capable of avoiding a drop in system stability due to erroneous detection of a broken path. In this way, the storage control apparatus 4 is capable of limiting the influence of a broken path that occurs due to a redundantly provided storage control apparatus being restarted.

Second Embodiment

Figure 2:
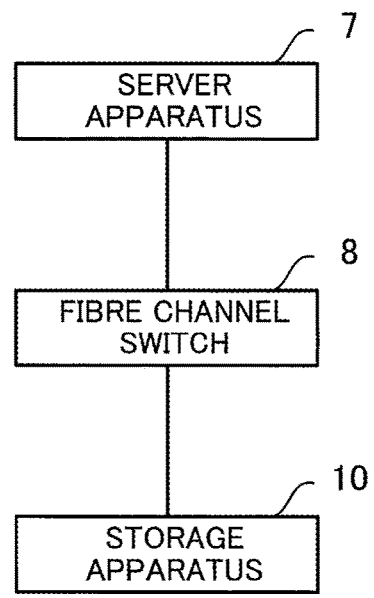
FIG. 2 depicts an example configuration of a storage system according to a second embodiment.

Next, a storage system according to a second embodiment will be described with reference to FIG. 2. FIG. 2 depicts an example configuration of a storage system according to the second embodiment.

The storage system 6 includes a server apparatus 7, a fibre channel switch 8, and a storage apparatus 10. The server apparatus 7 connects to the storage apparatus via the fibre channel switch 8 using FCoE (Fibre Channel over Ethernet), and is capable of writing data into a storage device provided in the storage apparatus 10 and reading data from a storage device.

Figure 3:
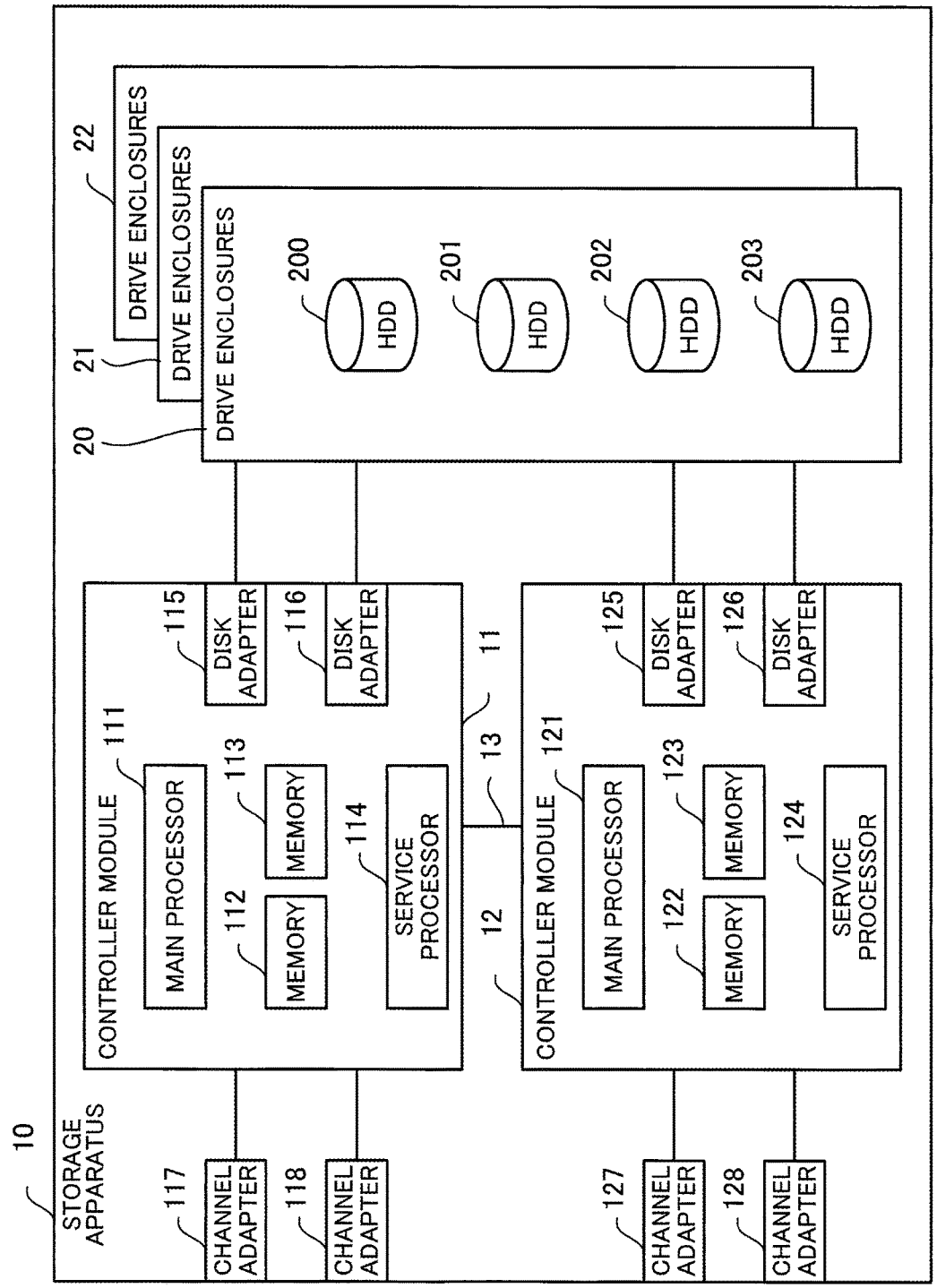
FIG. 3 depicts an example configuration of a storage apparatus according to the second embodiment.

Next, a storage apparatus according to the second embodiment will be described with reference to FIG. 3. FIG. 3 depicts an example configuration of a storage apparatus according to the second embodiment.

The storage apparatus 10 includes controller modules 11 and 12, drive enclosures 20, 21, and 22, and channel adapters 117, 118, 127, and 128.

The channel adapters 117, 118, 127, and 128 are server interface ports that are capable of connecting to the server apparatus 7 and function as fibre channel interfaces when connected to the server apparatus 7 via the fibre channel switch 8. The channel adapters 117 and 118 are provided corresponding to the controller module and the channel adapters 127 and 128 are provided corresponding to the controller module 12. The channel adapters 117, 118, 127, and 128 normally carry out a so-called "target operation", but are capable of carrying out an initiator operation, such as when settings are made.

The drive enclosures 20, 21, and 22 each include one or more storage devices. As one example, the drive enclosure 20 includes HDDs 200, 201, 202, and 203. Note that the drive enclosure 20 may include other storage devices, such as SSDs. The storage devices included in the drive enclosures 20, 21, and 22 are accessed from the server apparatus 7 via the controller module 11 or the controller module 12. As one example, the storage apparatus 10 realizes a RAID (Redundant Arrays of Independent Disks) using the storage devices provided in the drive enclosures 20, 21, and 22 and, together with the server apparatus 7 and the fibre channel switch 8, constructs a RAID system. The controller modules 11 and 12 each construct a RAID subsystem within such RAID system.

The controller module 11 and the controller module 12 are capable of cooperating so as to share a load. The controller module 11 and the controller module 12 are connected by a signal line 13. The signal line 13 includes a local bus used for transmitting and receiving data and a signal line used to give notification of an interrupt signal. Note that although the storage apparatus 10 includes the two controller modules 11 and 12, the storage apparatus 10 is not limited to this and may include three or more controller modules, such as four or eight controller modules.

The controller module 11 includes a main processor 111, memories 112 and 113, a service processor 114, and disk adapters 115 and 116. The controller module 12 includes a main processor 121, memories 122 and 123, a service processor 124, and disk adapters 125 and 126. Note that since the controller module 12 has the same configuration as the controller module 11, the controller module 11 is described below as a representative example of the controller modules 11 and 12.

The main processor 111, the memory 112, the channel adapters 117 and 118, and the disk adapters 115 and 116 are connected via a bus, not illustrated. The main processor 111 carries out the storage control performed by the controller module 11.

The service processor 114 and the memory 113 are connected via a system management bus, not illustrated. The service processor 114 functions as a monitoring module that monitors the operating state of the main processor 111. The service processor 114 is capable of monitoring the operating state of the main processor 111 using an IPMI (Intelligent Platform Management Interface) and also giving reboot (restart) instructions. The service processor 114 is also capable of producing interrupts to the main processor 111 that trigger path switching. As one example, the service processor 114 is capable of inputting an NMI (Non Maskable Interrupt) into the main processor 111 via an interrupt controller. By doing so, the service processor 114 is capable of providing the main processor 111 with a trigger for path switching with the highest priority.

Note that the main processor 111 and the service processor 114 may be multiprocessors. As examples, the main processor 111 and the service processor 114 may be a CPU (Central Processing Unit), an MPU (Micro Processing Unit), a DSP (Digital Signal Processor), an ASIC (Application Specific Integrated Circuit), or a PLD (Programmable Logic Device). The main processor 111 and the service processor 114 may also be a combination of two or more of a CPU, an MPU, a DSP, an ASIC, and a PLD.

The memory 112 is used to hold data when data has been read from a storage device and also acts as a buffer when writing data into a storage device. The memory 112 also stores user data and control information. The memory 113 stores control information for the service processor 114, a zoning settings table, configuration information, monitoring information for the main processor 111, and the like. As one example, the memory 113 includes a nonvolatile memory.

As one example, the memory 112 includes a RAM, such as a DIMM (Dual Interface Memory Module), and a nonvolatile memory. The memory 112 is used as the main storage apparatus of the controller module 11. At least part of an operating system (OS) program, firmware, and an application program to be executed by the main processor 111 is temporarily stored in the RAM. Various data used in processing by the main processor 111 is also stored in the RAM. The RAM also includes a cache memory that is separate to the memory used to store various data.

The nonvolatile memory retains its stored content even when the power of the storage apparatus 10 is off. As examples, the nonvolatile memory may be a semiconductor storage apparatus such as EEPROM (Electrically Erasable and Programmable ROM) or flash memory, or an HDD. The nonvolatile memory is used as an auxiliary storage apparatus of the controller module 11. The nonvolatile memory stores operating system programs and firmware, application programs, and various data.

An input/output interface and a communication interface can be given as examples of peripherals connected to the bus. The input/output interface connects to an input/output apparatus and makes inputs and outputs. The input/output interface transmits signals and data sent from a storage apparatus, such as an HDD, to the main processor 111 and/or the memory 112. As one example, the input/output interface also outputs a signal received from the main processor 111 to another control unit or to an output apparatus connected to the controller module 11. The communication interface transmits and receives data to and from another controller module (the controller module 12) inside the storage apparatus 10.

As one example, the input/output apparatus that connects to the input/output interface is a maintenance terminal. The maintenance terminal is a notebook PC (personal computer) or the like and connects to the input/output interface via Ethernet (registered trademark).

The disk adapters 115 and 116 perform interface control (access control) for the storage devices (for example, HDDs 200, 201, 202, and 203) provided in the drive enclosures 20, 21, and 22.

Using the hardware configuration described above, it is possible to realize the processing functions of the storage apparatus 10 and the controller modules 11 and 12. Note that the storage control apparatuses 4 and 4d according to the first embodiment can also be realized by the same hardware as the storage apparatus 10 and the controller modules 11 and 12. Here, the controller modules 11 and 12 each function as a storage control apparatus of the storage apparatus 10. The main processor 111 and the service processor 114 function as a control unit of the controller module 11, and the memories 112 and 113 function as a storage unit of the controller module 11. The main processor 121 and the service processor 124 function as a control unit of the controller module 12, and the memories 122 and 123 function as a storage unit of the controller module 12.

Figure 4:
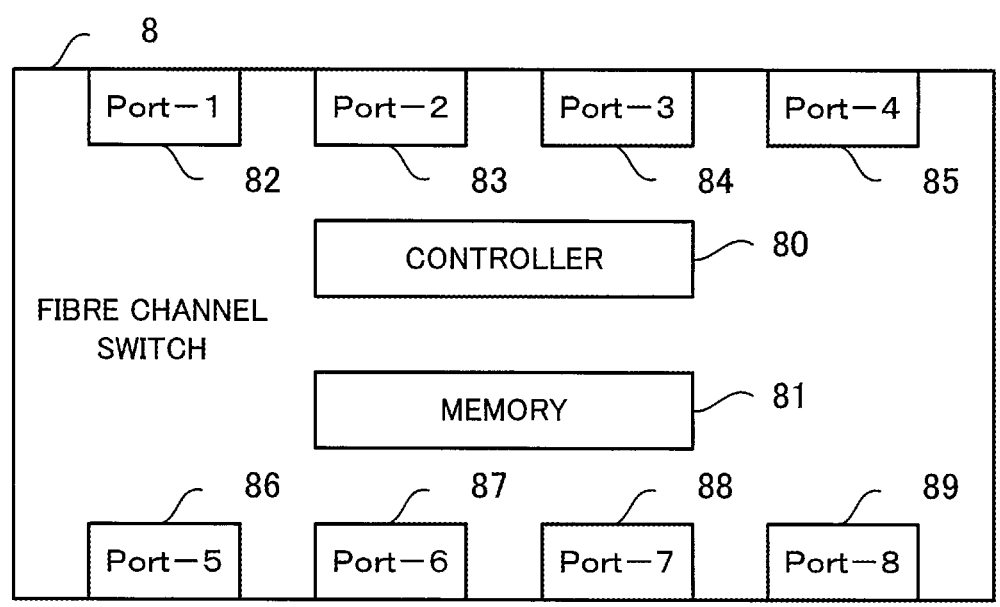
FIG. 4 depicts an example configuration of a fibre channel switch according to the second embodiment.

Next, the configuration of the fibre channel switch 8 will be described with reference to FIG. 4. FIG. 4 depicts an example configuration of the fibre channel switch according to the second embodiment.

The fibre channel switch 8 includes a controller 80, a memory 81, and ports 82 to 89. The controller 80 is in overall control of the fibre channel switch 8 and performs operations such as making various settings, setting paths, and switching between paths. Upon receiving instructions from the server apparatus 7 or the storage apparatus 10, the controller 80 is capable of reconfiguring the correspondence between the ports 82 to 89 to switch between paths. The memory 81 stores a zoning settings table, configuration information, and the like. The ports 82 to 85 are ports connected to the server apparatus 7 and the ports 86 to 89 are ports connected to the storage apparatus 10.

Note that the fibre channel switch 8 is one example of a switch that is capable of switching paths based on instructions from the server apparatus 7 or the storage apparatus 10. Another example of this type of switch is a SAS (Serial Attached SCSI (Small Computer System Interface)) switch. It is sufficient for the switch to be capable of switching paths based on instructions from the storage apparatus 10 side, with a switch that uses an interface such as a PCIe (Peripheral Component Interconnect express) and a unique node switching switch as examples of this type of switch.

Figure 5:
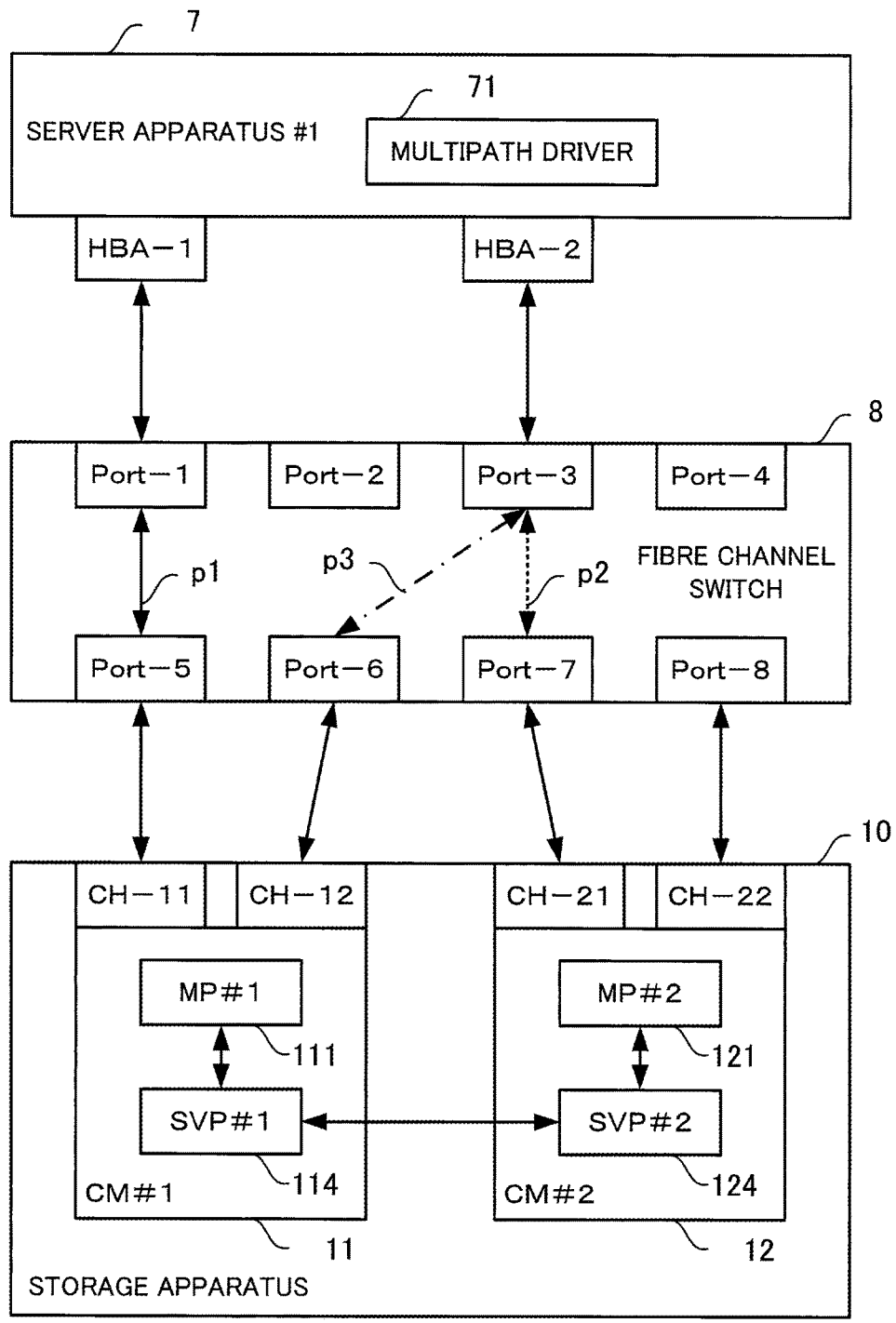
FIG. 5 depicts examples of path configuration and failure recovery of the storage system according to the second embodiment.

Next, the path configuration of the storage system 6 will be described with reference to FIG. 5. FIG. 5 depicts examples of path configuration and failure recovery of the storage system according to the second embodiment.

In the following description, to clarify the connection relationship when describing the path configuration, the server apparatus 7 is referred to as "server apparatus #1" and the interfaces of the server apparatus #1 are referred to as "HBA (Host Bus Adapter)-1" and "HBA-2". Also, the ports 82 to 89 of the fibre channel switch 8 are respectively referred to as "Port-1" to "Port-8". The two controller modules 11 and 12 provided in the storage apparatus 10 are respectively referred to as "CM#1" and "CM#2", the main processors 111 and 121 are respectively referred to as "MP#1" and "MP#2", and the service processors 114 and 124 are respectively referred to as "SVP#1" and "SVP#2". The channel adapters 117 and 118 of "CM#1" are respectively referred to as "CH-11" and "CH-12" and the channel adapters 127 and 128 of "CM#2" are respectively referred to as "CH-21" and "CH-22".

The fibre channel switch 8 and server apparatus #1 are connected by HBA-1 and Port-1 and are also connected by HBA-2 and Port-3. CM#1 and the fibre channel switch 8 are connected by CH-11 and Port-5 and are also connected by CH-12 and Port-6. CM#2 and the fibre channel switch 8 are connected by CH-21 and Port-7 and are also connected by CH-22 and Port-8.

When CM#1 and CM#2 are operating normally, the fibre channel switch 8 connects Port-1 and Port-5 and also connects Port-3 and Port-7. Accordingly, server apparatus #1 and CM#1 are connected on the path p1 that passes HBA-1, Port-1, Port-5, and CH-11. Server apparatus #1 and CM#2 are connected on the path p2 that passes HBA-2, Port-3, Port-7, and CH-21.

Here, when a failure occurs at CM#2, CM#2 attempts to recover by rebooting (restarting) MP#2. SVP#2 is capable of monitoring the state of MP#2 and notifies CM#1 of a failure at CM#2 via a local bus connected to SVP#1 before rebooting MP#2. CM#1 that has detected the failure at CM#2 instructs the fibre channel switch 8 to switch the path p2 and accordingly the fibre channel switch 8 switches from the path p2 that connects HBA-2 and CH-21 to the path p3 that connects HBA-2 and CH-12. By doing so, the server apparatus #1 and CM#1 are connected on the path p3 that passes HBA-2, Port-3, Port-6, and CH-12, and CM#2 becomes cut off from the server apparatus #1. After confirming that the fibre channel switch 8 has switched from path p2 to path p3, CM#1 gives an instruction for (i.e., permits) rebooting of MP#2.

By doing so, the server apparatus #1 is capable of ensuring that the access to the storage devices that was being performed from HBA-2 via CM#2 can continue via CM#1. That is, the storage apparatus 10 is capable of limiting the influence of a broken path caused by restarting a redundantly provided controller module.

Note that there are also cases where the server apparatus #1 is capable of detecting a failure on an access path from a time out when accessing a storage device and of giving an instruction for switching the path from HBA-2 to HBA-1 using a multipath driver 71 and/or of instructing the fibre channel switch 8 to switch path. However, since the storage apparatus 10 is capable of detecting errors by itself, it is possible to detect a failure earlier than the server apparatus #1 that detects a failure on an access path by monitoring for time outs.

By completing path switching at the fibre channel switch 8 within the period for which the server apparatus #1 monitors for time outs, the storage apparatus 10 eliminates the necessity for failure handling by the server apparatus #1. That is, since the storage apparatus 10 allows the server apparatus #1 not to have a path switching function, it is possible to lower the system requirements of a server apparatus that connects to the storage apparatus 10. Note that by sending a "busy" reply to accesses from the server apparatus #1 until the switching of paths at the fibre channel switch 8 is complete, the storage apparatus 10 is capable of preventing a time out for the monitoring period during which failures on an access path are detected.

Note that although an example where a failure occurs at CM#2 is illustrated in FIG. 5, the same procedure is used when a failure occurs at CM#1.

Figure 6:
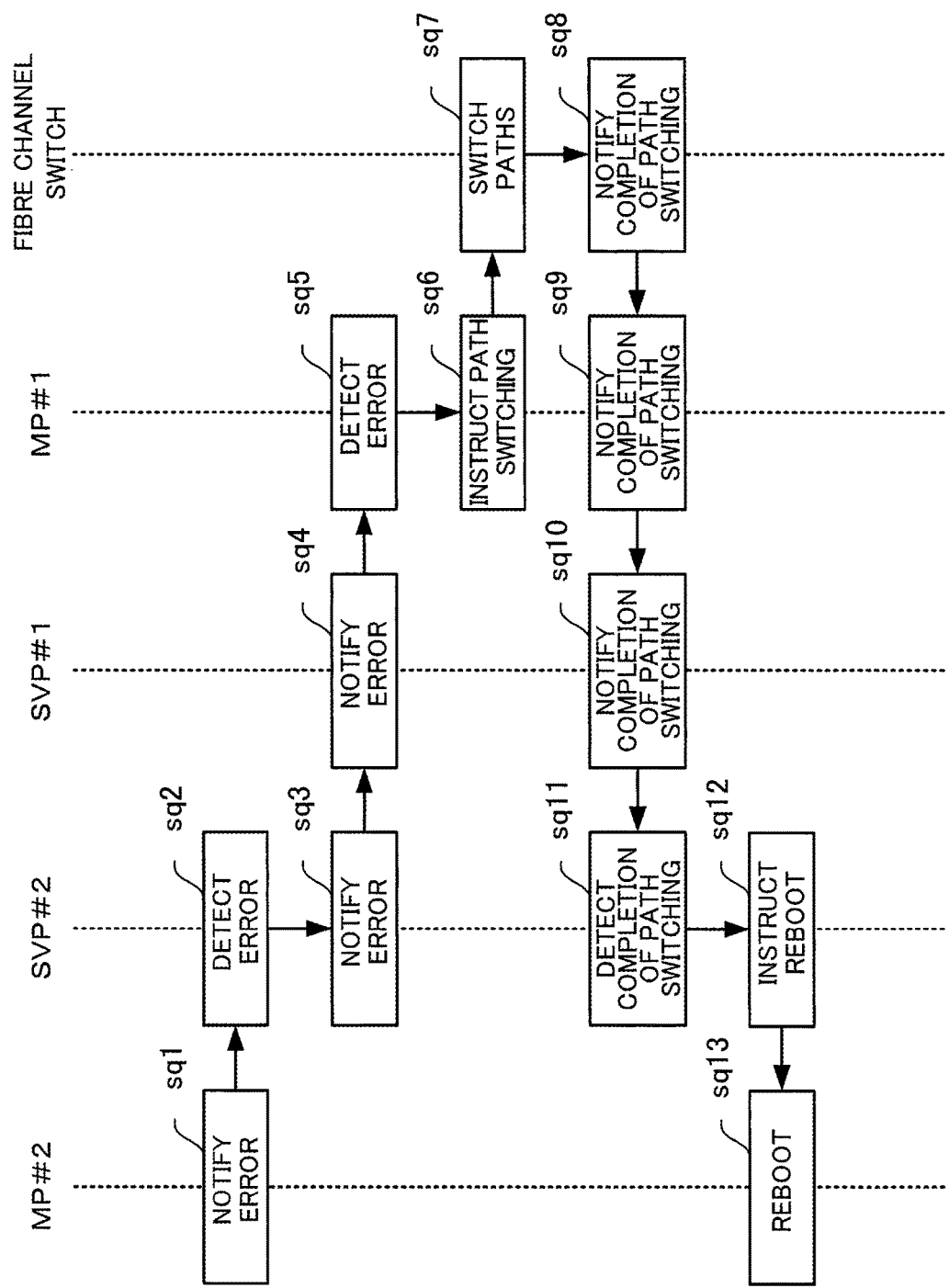
FIG. 6 depicts an example timing chart of failure recovery in the storage system according to the second embodiment (first scenario)

Next, a failure recovery procedure for the storage system 6 will be described with reference to FIGS. 6 to 8. First, the failure recovery procedure up to rebooting of a failed controller module will be described with reference to FIG. 6. FIG. 6 depicts an example timing chart of failure recovery in the storage system according to the second embodiment (first scenario).

Sequence sq1: MP#2 notifies SVP#2 of a detected error. As examples, the error detected by MP#2 may be a hardware or software failure, a failure of the MP#2 itself, or a failure of CH#21 or CH#22.

Sequence sq2: On receiving the notification from MP#2, SVP#2 detects an error at MP#2.

Sequence sq3: SVP#2 updates a status register (control information) based on the detected error and notifies SVP#1 of the error. As one example, the status register is sixteen bit, and SVP#2 sets bits corresponding to an interrupt signal and a reboot wait signal at "1". By setting the bit corresponding to the interrupt signal of the status register at "1", SVP#2 outputs an interrupt signal (for a hard reset) to the SVP#1.

Sequence sq4: At the timing of input of an interrupt signal from SVP#2, SVP#1 acquires the control information of SVP#2 on a local bus and notifies MP#1 of the error at MP#2 detected from the control information, that is, the error at CM#2. The control information includes status information of CM#2 and remote control information (requests and Ack (acknowledgments)) for cooperative operation of SVP#1 and SVP#2. By doing so, SVP#1 is capable of grasping the state of CM#2 and is also capable of increasing cooperation with SVP#2.

Sequence sq5: MP#1 detects the error of CM#2.

Sequence sq6: MP#1 instructs the controller 80 of the fibre channel switch 8 to switch paths. As one example, MP#1 instructs the controller 80 to switch paths from path p2 to path p3 (see FIG. 5).

Sequence sq7: The controller 80 of the fibre channel switch 8 switches paths from path p2 to path p3.

Sequence sq8: The controller 80 of the fibre channel switch 8 notifies MP#1 of completion of path switching from path p2 to path p3.

Sequence sq9: MP#1 notifies SVP#1 of the completion of path switching.

Sequence sq10: SVP#1 notifies SVP#2 of the completion of path switching. As examples, SVP#1 notifies SVP#2 of the completion of path switching by setting a bit corresponding to path switching in the status register of SVP#2 at "1" or setting a bit corresponding to Ack reboot at "1".

Sequence sq11: SVP#2 detects the completion of path switching. As one example, SVP#2 detects the completion of path switching from the bit corresponding to Ack reboot in the status register being set at "1".

Sequence sq12: SVP#2 instructs MP#2 to reboot.

Sequence sq13: MP#2 performs a reboot. At this time, SVP#2 may be capable of informing SVP#1 that MP#2 is performing a reboot. As one example, SVP#2 is capable of notifying SVP#1 that MP#2 is mid-execution of a reboot by setting a bit corresponding to mid-execution of a reboot in the status register of SVP#2 at "1".

In this way, the storage apparatus 10 executes a reboot of CM#2 after switching from a path between CM#2 and server apparatus #1 to a path between CM#1 and server apparatus #1. By doing so, the storage apparatus 10 is capable of executing a reboot of CM#2 while limiting the influence on server apparatus #1 of a broken path.

Next, a failure recovery procedure where a failed controller module is restored to normal operation after executing a reboot of the failed controller module will be described with reference to FIG. 7. FIG. 7 depicts an example timing chart of failure recovery in the storage system according to the second embodiment (second scenario).

Sequence sq21: MP#2 is restored to normal by executing a reboot. Note that in addition to MP#2, CM#2 may include peripherals connected to MP#2 (for example, CH-21 and CH-22) as devices that are to be rebooted. Since SVP#2 monitors whether MP#2 has been restored to normal, SVP#2 is not included as a device to be rebooted. That is, MP#2 is subjected to rebooting but SVP#2 is not rebooted.

Sequence sq22: SVP#2 detects the restoration of MP#2.

Sequence sq23: SVP#2 notifies SVP#1 of the restoration of MP#2. As one example, SVP#2 notifies SVP#1 of the restoration of MP#2 by setting a bit corresponding to "Ready" in the status register of SVP#2 at "1".

Sequence sq24: SVP#1 notifies MP#1 of the restoration of MP#2, that is, the restoration of CM#2.

Sequence sq25: MP#1 detects the restoration of CM#2.

Sequence sq26: MP#1 instructs the controller 80 of the fibre channel switch 8 to switch paths. For example, MP#1 instructs the controller 80 to switch paths from the path p3 to the path p2 (see FIG. 5).

Sequence sq27: The controller 80 of the fibre channel switch 8 switches paths from the path p3 to the path p2.

Sequence sq28: The controller 80 of the fibre channel switch 8 notifies MP#1 of the completion of path switching from the path p3 to the path p2.

Sequence sq29: MP#1 notifies SVP#1 of the completion of path switching.

Sequence sq30: SVP#1 notifies SVP#2 of the completion of path switching. For example, SVP#1 notifies SVP#2 of the completion of path switching by setting a bit corresponding to path switching in the status register of SVP#2 at "0".

Sequence sq31: SVP#2 detects the completion of path switching. For example, SVP#2 detects the completion of path switching from the status register.

Sequence sq32: SVP#2 notifies MP#2 of the completion of path switching.

Sequence sq33: MP#2 receives notification of the completion of path switching and can therefore confirm that the path has been restored.

In this way, it is possible for the storage apparatus 10 to limit the influence on the server apparatus #1 and to reestablish the path that was temporarily cut off due to CM#2 being restarted. The storage system 6 is also capable of reestablishing a path that was temporarily cut off without needing a system engineer to perform any operations.

Next, the failure recovery procedure when an error continues for a failed controller module even after the controller module has been rebooted will be described with reference to FIG. 8. FIG. 8 depicts an example timing chart for failure recovery in the storage system according to the second embodiment (third scenario).

Sequence sq41: MP#2 does not return to normal after a reboot has been executed and an error continues.

Sequence sq42: SVP#2 detects that restoration of MP#2 has failed.

Sequence sq43: SVP#2 notifies SVP#1 that restoration of MP#2 has failed. For example, SVP#2 notifies SVP#1 that restoration of MP#2 has failed by not setting a bit corresponding to "Ready" in the status register of SVP#2 at "1".

Sequence sq44: SVP#1 notifies MP#1 that the restoration of MP#2 has failed, that is, the restoration of CM#2 has failed.

Sequence sq45: MP#1 detects that the restoration of CM#2 has failed.

Sequence sq46: MP#1 monitors the performance (for example, the response time to requests from server apparatus #1 and/or IOPS (Input Output Per Second)) of the storage apparatus 10 after path switching from path p2 to path p3 (see FIG. 5).

Sequence sq47: When the performance of the storage apparatus 10 does not satisfy a threshold, MP#1 instructs the controller 80 of the fibre channel switch 8 to switch paths in order to cut off CM#2 from the storage system 6.

Sequence sq48: The controller 80 of the fibre channel switch 8 performs path switching that cuts off the path connection between server apparatus #1 and CM#2.

Sequence sq49: MP#1 notifies the server apparatus #1 of the error of CM#2 (degradation of the storage apparatus 10).

Sequence sq50: Server apparatus #1 detects the error at CM#2. By doing so, the server apparatus #1 is capable of performing path switching using the multipath driver 71 without depending on the fibre channel switch 8.

Figure 9:
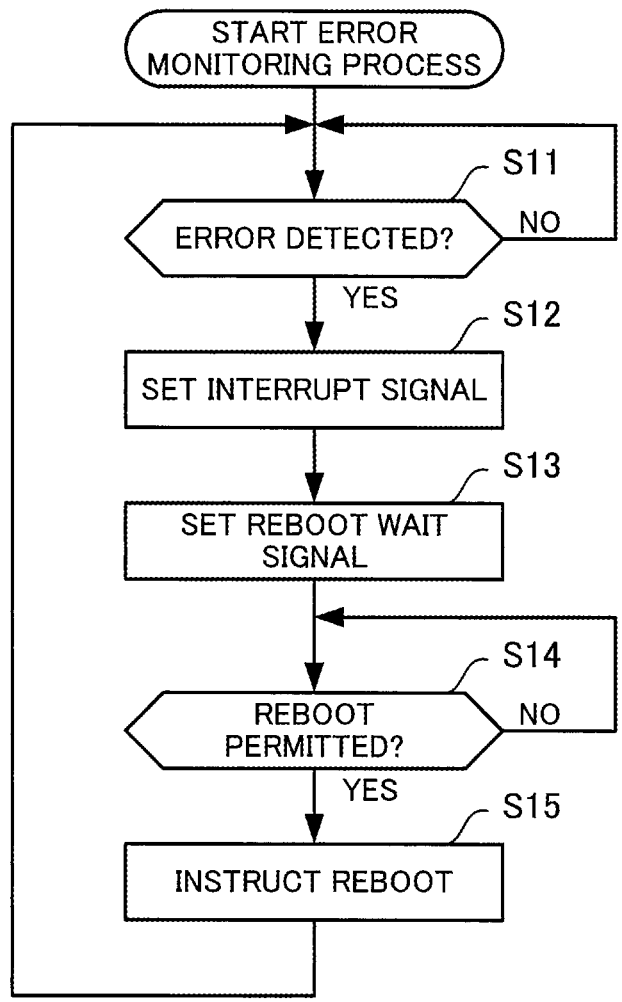
FIG. 9 is a flowchart of the error monitoring process according to the second embodiment.

Next, an error monitoring process according to the second embodiment will be described with reference to FIG. 9. FIG. 9 is a flowchart of the error monitoring process according to the second embodiment.

The error monitoring process is a process executed by a service processor of a failed controller module. For example, when the failed controller module is CM#2, the SVP#2 executes an error monitoring process. The error monitoring process is processing that is equivalent to sequence sq2, sequence sq3, sequence sq11, and sequence sq12 of the failure recovery process depicted in FIG. 6. The error monitoring process is described below with the failed controller module as CM#2 and the controller module that is redundantly provided together with the failed controller module as CM#1.

Step S11: SVP#2 monitors MP#2 and determines whether an error has been detected at MP#2. When an error has been detected at MP#2, SVP#2 proceeds to step S12, while when an error has not been detected at MP#2, SVP#2 continues to monitor MP#2.

Step S12: SVP#2 sets a bit corresponding to an interrupt signal in the status register at "1". Due to the bit corresponding to the interrupt signal being set in the status register, SVP#2 outputs an NMI (Non Maskable Interrupt) to SVP#1. Using the NMI, SVP#2 is capable of notifying SVP#1 of the error at MP#2.

Step S13: SVP#2 sets the bit corresponding to a reboot wait signal in the status register at "1". By having SVP#1, where an interrupt has occurred due to the NMI, read out a value in the status register, SVP#2 is capable of notifying SVP#1 of the control state of MP#2.

Step S14: SVP#2 waits for reboot permission. Since the bit corresponding to Ack Reboot in the status register is "1", SVP#2 detects that path switching is complete and determines that rebooting is permitted. When rebooting is permitted, SVP#2 proceeds to step S15, while when rebooting is not permitted, SVP#2 continues to wait for permission to reboot.

Step S15: SVP#2 instructs MP#2 to reboot and proceeds to step S11.

In this way, by executing the error monitoring process, the SVP of a failed controller module in the storage apparatus 10 functions as an error detecting means/failure detecting means that detects errors at a controller module in the same system and also as an error notifying means that notifies controller modules in other systems of the error at the controller module in the same system. The SVP of a failed controller module in the storage apparatus 10 also functions as a reboot control means that receives reboot permission from a controller module of another system and performs reboot control of a controller module in the same system.

Figure 10:
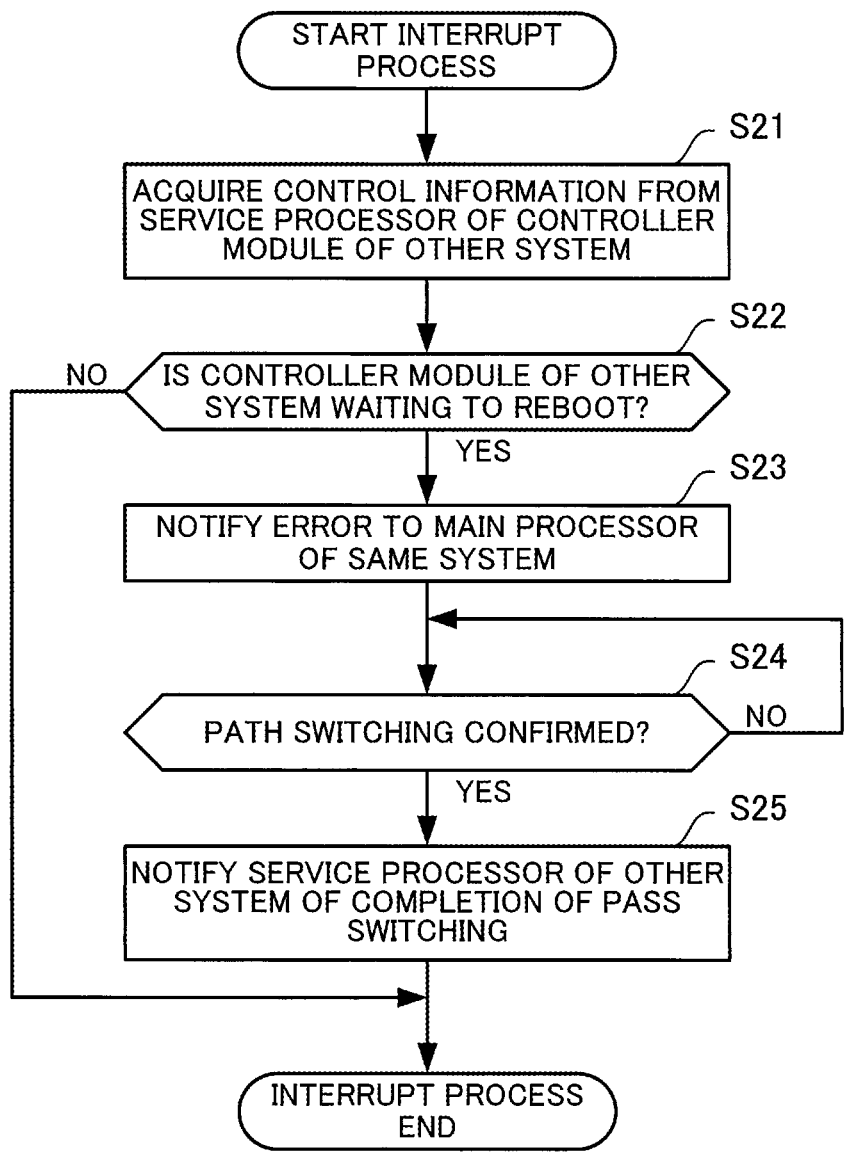
FIG. 10 is a flowchart of an interrupt process according to the second embodiment.

Next, an interrupt process according to the second embodiment will be described with reference to FIG. 10. FIG. 10 is a flowchart of the interrupt process according to the second embodiment.

The interrupt process is executed by the SVP of the controller module into which the NMI has been inputted. For example, when the failed controller module is CM#2, the interrupt process is executed by SVP#1 into which the NMI outputted by the SVP#2 has been inputted. This interrupt process is processing that is equivalent to sequence sq4 and sequence sq10 of the failure recovery procedure depicted in FIG. 6. The interrupt process is described below with CM#2 as the failed controller module and CM#1 as the controller module of the system that is redundantly provided together with the failed controller module (the controller module of the other system).

Step S21: SVP#1 acquires control information from SVP#2 (the SVP of the controller module of the other system). SVP#1 is capable of acquiring control information by reading out values in the status register of SVP#2.

Step S22: SVP#1 determines from the control information whether the controller module of the other system is waiting to reboot. SVP#1 is capable of determining that the controller module of the other system is waiting to reboot when the bit corresponding to awaiting reboot in the status register of SVP#2 is set at "1". SVP#1 proceeds to step S23 when the controller module of the other system is waiting to reboot and ends the interrupt process when the controller module of the other system is not waiting to reboot.

Step S23: SVP#1 notifies MP#1 (the main processor of the same system) of an error at the controller module of the other system. As a result, MP#1 is capable of detecting an error at the controller module of the other system and instructing the fibre channel switch 8 to switch paths.

Step S24: SVP#1 waits for notification from MP#1 that confirms path switching. SVP#1 proceeds to step S25 when notification has been received and continues to wait for confirmation when notification has not been received.

Step S25: SVP#1 notifies SVP#2 of the completion of path switching and ends the interrupt process. SVP#1 is capable of notifying SVP#2 of the completion of path switching by setting the bit corresponding to an Ack reboot in the status register of SVP#2 at "1".

In this way, by executing the interrupt process, a service processor that has inputted an NMI from a failed controller module in the storage apparatus 10 functions as an other-system controller module error detecting means that detects an error at a controller module of another system and an other-system error notifying means that notifies the main processor in the same system of the error at the controller module of the other system. Also, by executing the interrupt process, a service processor that has inputted an NMI from a failed controller module in the storage apparatus 10 functions as an on-error path switching completion notifying means that notifies the controller module of another system of the completion of path switching by the fibre channel switch 8.

Figure 11:
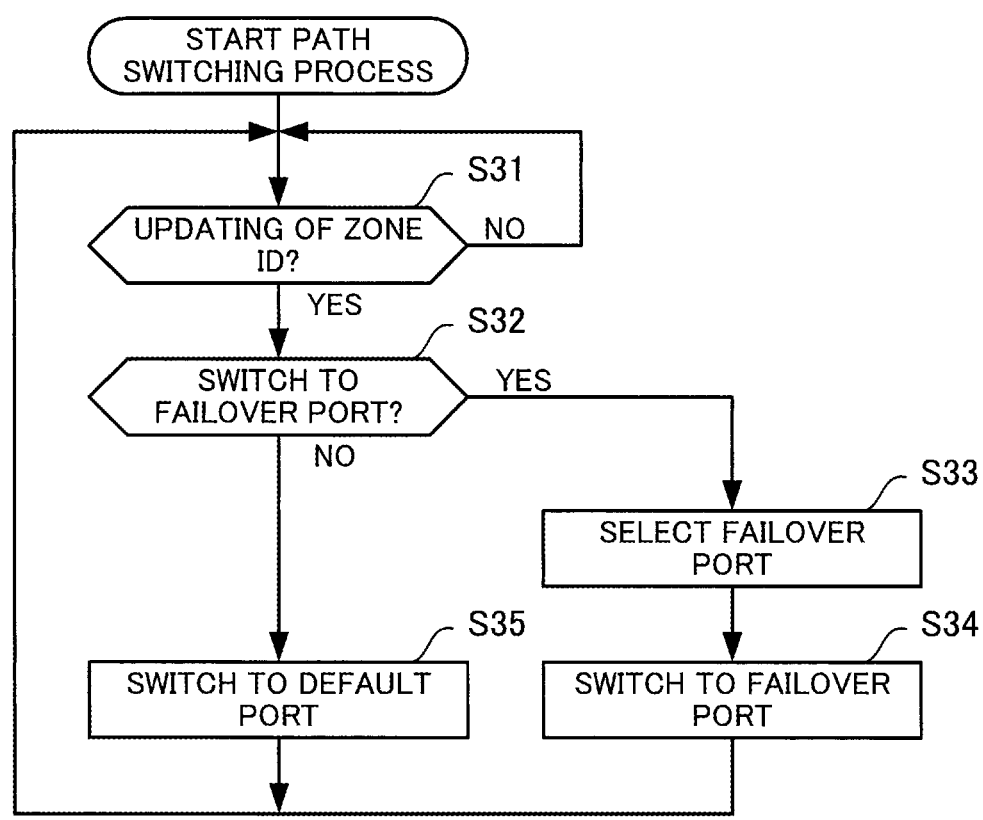
FIG. 11 is a flowchart of a path switching process according to the second embodiment.

Next, the path switching process according to the second embodiment will be described with reference to FIG. 11. FIG. 11 is a flowchart of the path switching process according to the second embodiment.

The path switching process is executed by a fibre channel switch control unit, i.e., the controller 80 of the fibre channel switch 8.

Step S31: The fibre channel switch control unit determines whether a zone ID has been updated. The zone ID is one of the parameters in the zoning settings table. The zoning settings table is generated from zoning information provided from CM#1, CM#2, or a maintenance terminal, and is stored in the memory 81. The zoning settings table that includes zone IDs will be described later with reference to FIG. 12.

The fibre channel switch control unit proceeds to step S32 when a zone ID has been updated and waits for the updating of a zone ID when a zone ID has not been updated.

Step S32: The fibre channel switch control unit determines whether the updating of a zone ID indicates a switch to a failover port. Note that the updating of a zone ID can be a switch to a failover port (i.e., to a failover path) or a switch to a default port (i.e., to a default path). When the updating of zone ID indicates a switch to a failover port, the fibre channel switch control unit proceeds to step S33. On the other hand, when the updating of zone ID does not indicate a switch to a failover port, that is, when the updating of zone ID indicates a switch to a default port, the fibre channel switch control unit proceeds to step S35.

Step S33: The fibre channel switch control unit selects a failover port for connecting server apparatus #1 to the redundant controller module with respect to the controller module that has been subjected to the updating of zone ID. Since at least one failover port candidate is provided in advance, the fibre channel switch control unit selects one of the failover port candidates in accordance with a priority order.

Step S34: The fibre channel switch control unit switches to the selected failover port and then proceeds to step S31.

Step S35: The fibre channel switch control unit switches to the default port and then proceeds to step S31. Note that the default port differs to the failover ports and since only one default port is set, the fibre channel switch control unit does not need to select the default port.

In this way, by executing the path switching process, the fibre channel switch control unit functions as a path switching means that switches from the default path to a failover path and as a path restoring means that switches from a failover path to the default path (or "restores the default path"). By executing the path switching process, the fibre channel switch control unit also functions as a path switching control means that performs path switching control based on the zoning settings table.

Next, the zoning settings table will be described with reference to FIG. 12. FIG. 12 depicts one example of the zoning settings table according to the second embodiment.

The zoning settings table 300 is information that the controller module 11 stores in the memory 112, the controller module 12 stores in the memory 122, and the fibre channel switch 8 stores in the memory 81. The zoning settings table 300 is one form of path connection information. The zoning settings table 300 is updated by the controller module 11, the controller module 12, and the fibre channel switch 8 as zoning information.

As parameters, the zoning settings table 300 includes zone IDs, host ports, SW ports (host side), SW ports (controller module side), and failover ports. The failover ports include at least one failover port candidate.

The zone ID is identification information of a setting content that associates the parameters given in the row direction.

The zone ID is assigned a unique number with "0" as the lowest digit. When the lowest digit of the zone ID is "0", this designates that a path is a default path, while when the lowest digit of the zone ID is "1", this designates that a path is a failover path.

The controller modules 11 and 12 are capable of controlling path switching at the fibre channel switch 8 by updating the lowest digit of a zone ID. That is, when the lowest digit of a zone ID has been updated by the controller module 11 or 12 from "0" to "1", the fibre channel switch 8 switches the path corresponding to the zone ID from the default path to a failover path. Also, when the lowest digit of the zone ID has been updated from "1" to "0" by the controller module 11 or 12, the fibre channel switch 8 switches the path corresponding to the zone ID from a failover path to the default path.

The host port indicates the port name of the server apparatus (host) 7 that connects to the fibre channel switch 8. The SW port (host side) indicates the port name on the server apparatus 7 side of the fibre channel switch 8. The SW ports (controller module side) indicate a pair of a port name on the storage apparatus 10 side of the fibre channel switch 8 and a port name of the storage apparatus 10 that connects to the fibre channel switch 8. Note that the combination of a host port, an SW port (host side), and SW ports (CM side) designates the default path.

The failover ports include at least one candidate. Each candidate is assigned a sequential number designating a priority, and a pair of a port name on the storage apparatus 10 side of the fibre channel switch 8 and a port name of the storage apparatus 10 that connects to the fibre channel switch 8 is set for each valid candidate. Note that in the illustrated zoning settings table 300, invalid candidates are indicated as "-".

As one example, in the illustrated zoning settings table 300, since the lowest digit of the zone ID "10" is "0", this indicates that the fibre channel switch 8 sets a path that passes the host port "HBA-1" and the SW port (host side) "Port-1" as the default path. That is, the fibre channel switch 8 connects the host port "HBA-1", the SW port (host side) "Port-1", and the SW ports (CM side) "Port-5, CH-11".

Also, when the zone ID "10" is updated to "11", the fibre channel switch 8 selects the failover port with the priority "1" and switches from the default path to a failover path. In this example, the fibre channel switch 8 connects the host port "HBA-1", the SW port (host side) "Port-1", and the SW ports (CM side) "Port-7, CH-21". Note that when the failover port with the priority "2" is selected, the fibre channel switch 8 connects the host port "HBA-1", the SW port (host side) "Port-1", and the SW ports (CM side) "Port-8, CH-22". Note that the fibre channel switch 8 is capable of selecting a failover port with a lower priority based on failure detection and load balance control.

Note that the initial information in the zoning settings table 300 may be set by a maintenance terminal, or may be generated by the storage apparatus 10 or the fibre channel switch 8 acquiring settings information for the various appliances and analyzing the connection relationships. As one example, a maintenance terminal is capable of logging into an http server of the controller module 11 and generating the zoning settings table 300 using a GUI (Graphic User Interface) or CLI (Command Line Interface). The zoning settings table 300 is transferred to the fibre channel switch 8 and is also stored in the memory 113 via the main processor 111 and the service processor 114.

Next, rebooting during a firmware update of the controller modules 11 and 12 of the storage system 6, and path switching that accompanies rebooting will be described. Aside from a reboot when a failure has occurred, the storage system 6 is also capable of executing a reboot during a firmware update.

Figure 13:
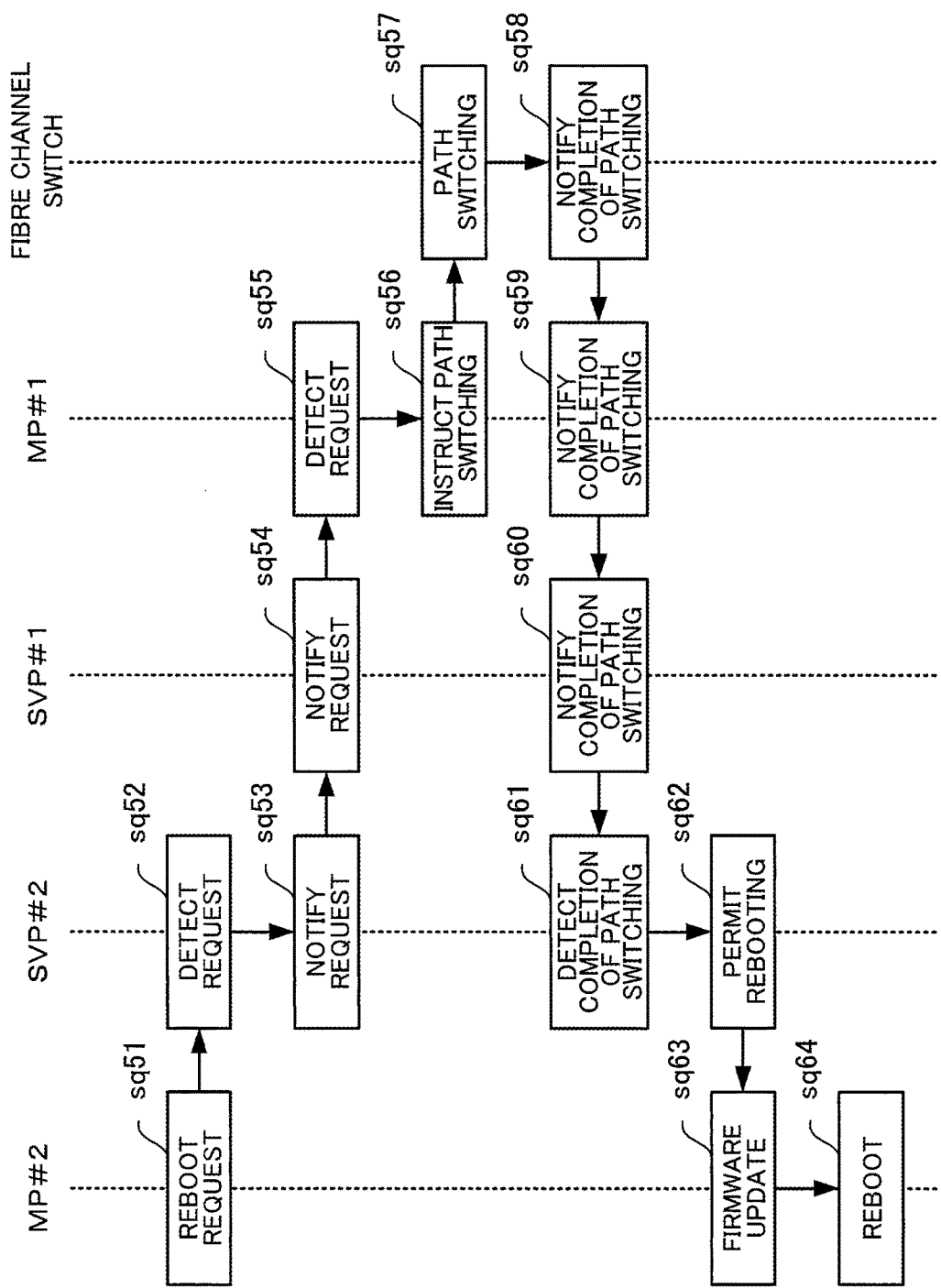
FIG. 13 depicts an example timing chart for a firmware update in the storage system according to the second embodiment.

The firmware update procedure of the storage system 6 will be described with reference to FIG. 13. FIG. 13 depicts an example timing chart for a firmware update in the storage system according to the second embodiment.

Sequence sq51: MP#2 notifies SVP#2 of a reboot request at the execution timing of a firmware update. MP#2 is capable of deciding the execution timing of a firmware update based on various conditions (such as when the preparation of the firmware to be updated has been completed, a time period where the load on CM#2 is low, and when the controller module of the other system (CM#1) is operating normally).

Sequence sq52: SVP#2 receives the notification from MP#2 and detects the reboot request for MP#2.

Sequence sq53: SVP#2 updates the status register (control information) based on the detected reboot request and notifies SVP#1 of the reboot request. For example, SVP#2 sets the bits corresponding to an interrupt signal and a reboot request signal at "1". By setting the bit corresponding to the interrupt signal in the status register at "1", SVP#2 outputs a quasi-hardware interrupt signal to SVP#1.

Sequence sq54: At the timing of input of an interrupt signal from SVP#2, SVP#1 acquires control information of SVP#2 via a local bus and notifies MP#1 of a reboot request for CM#2 detected from the control information.

Sequence sq55: MP#1 detects the reboot request for CM#2.

Sequence sq56: MP#1 instructs the controller 80 of the fibre channel switch 8 to switch paths. As one example, MP#1 instructs the controller 80 to switch paths from path p2 to path p3 (see FIG. 5).

Sequence sq57: The controller 80 of the fibre channel switch 8 switches paths from path p2 to path p3.

Sequence sq58: The controller 80 of the fibre channel switch 8 notifies MP#1 of the completion of path switching from path p2 to path p3.

Sequence sq59: MP#1 notifies SVP#1 of the completion of path switching.

Sequence sq60: SVP#1 notifies SVP#2 of the completion of path switching. As examples, SVP#1 notifies SVP#2 of the completion of path switching by setting the bit corresponding to path switching in the status register of SVP#2 at "1" or by setting the bit corresponding to Ack reboot at "1".

Sequence sq61: SVP#2 detects the completion of path switching. As one example, SVP#2 detects the completion of path switching due to the bit corresponding to Ack reboot in the status register being set at "1".

Sequence sq62: SVP#2 permits MP#2 to reboot.

Sequence sq63: MP#2 updates the firmware.

Sequence sq64: MP#2 executes a reboot.

Figure 7:
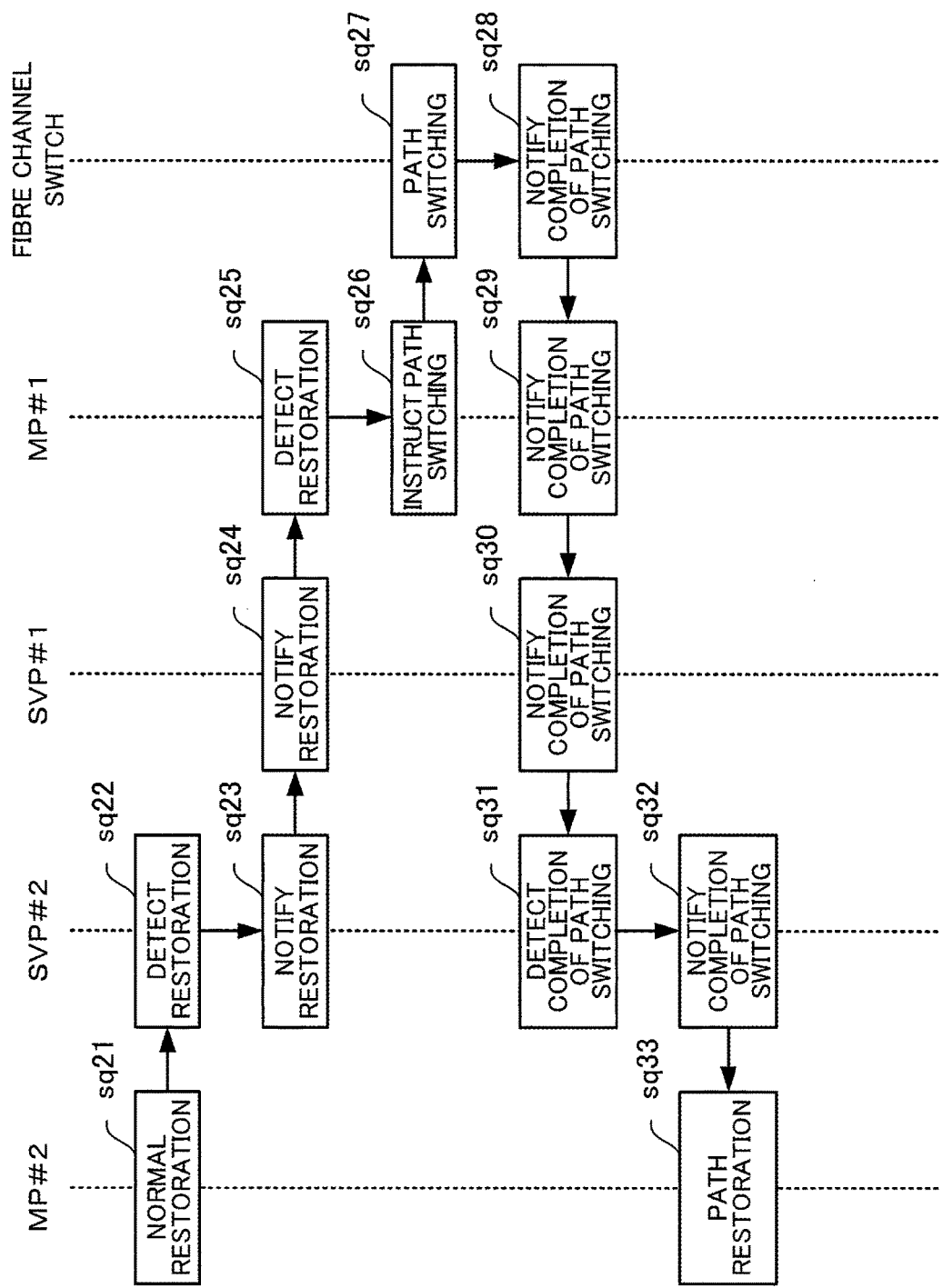
FIG. 7 depicts an example timing chart of failure recovery in the storage system according to the second embodiment (second scenario)
Figure 8:
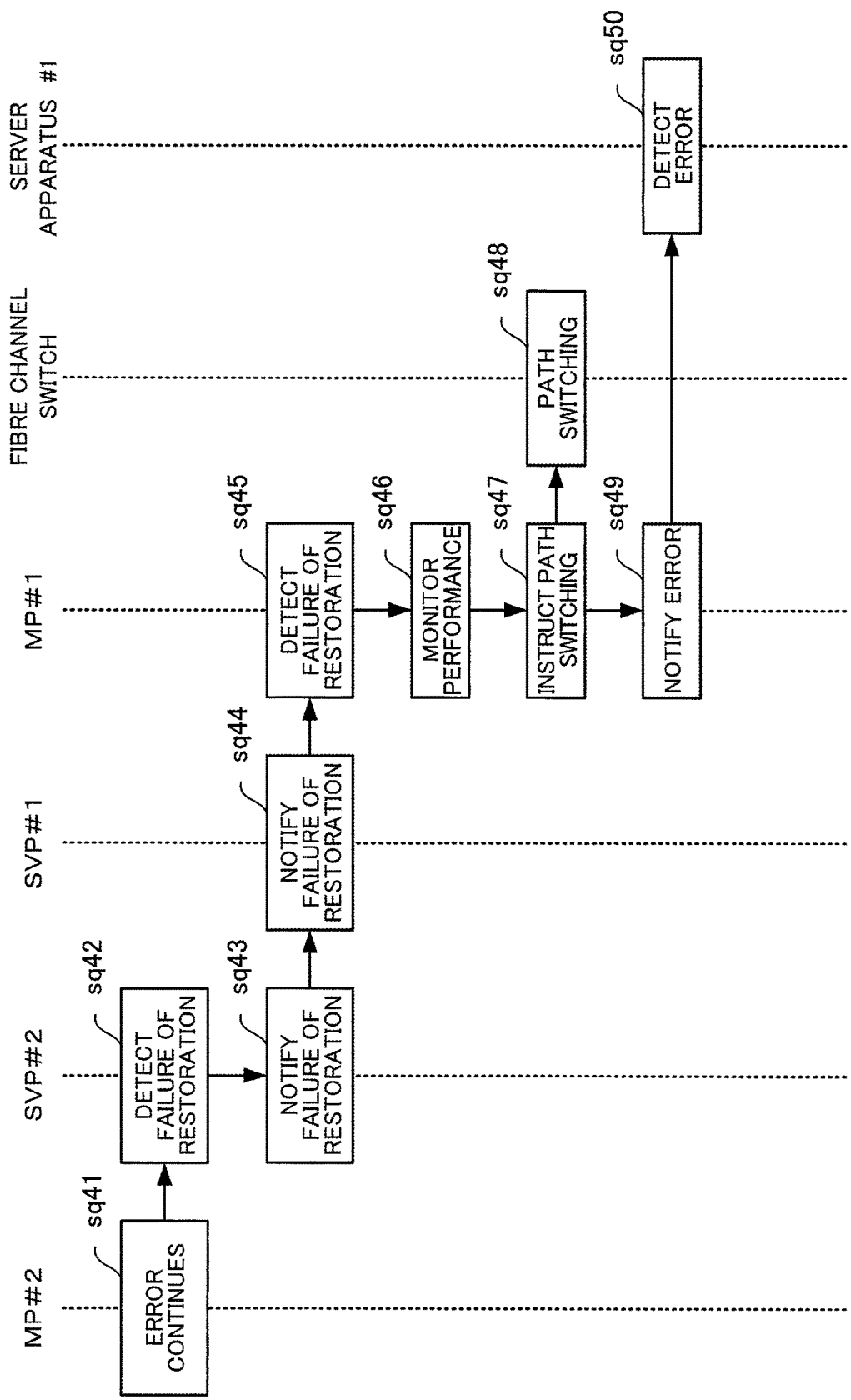
FIG. 8 depicts an example timing chart for failure recovery in the storage system according to the second embodiment (third scenario)

Note that path switching after the execution of a reboot of CM#2 can be performed in the same way as the timing chart of failure recovery depicted in FIG. 7.

In this way, the storage apparatus 10 executes a reboot of CM#2 after switching from a path between CM#2 and server apparatus #1 to a path between CM#1 and server apparatus #1. By doing so, it is possible for the storage apparatus 10 to execute a reboot of CM#2 while limiting the influence on server apparatus #1 of a broken path.

Third Embodiment

Figure 14:
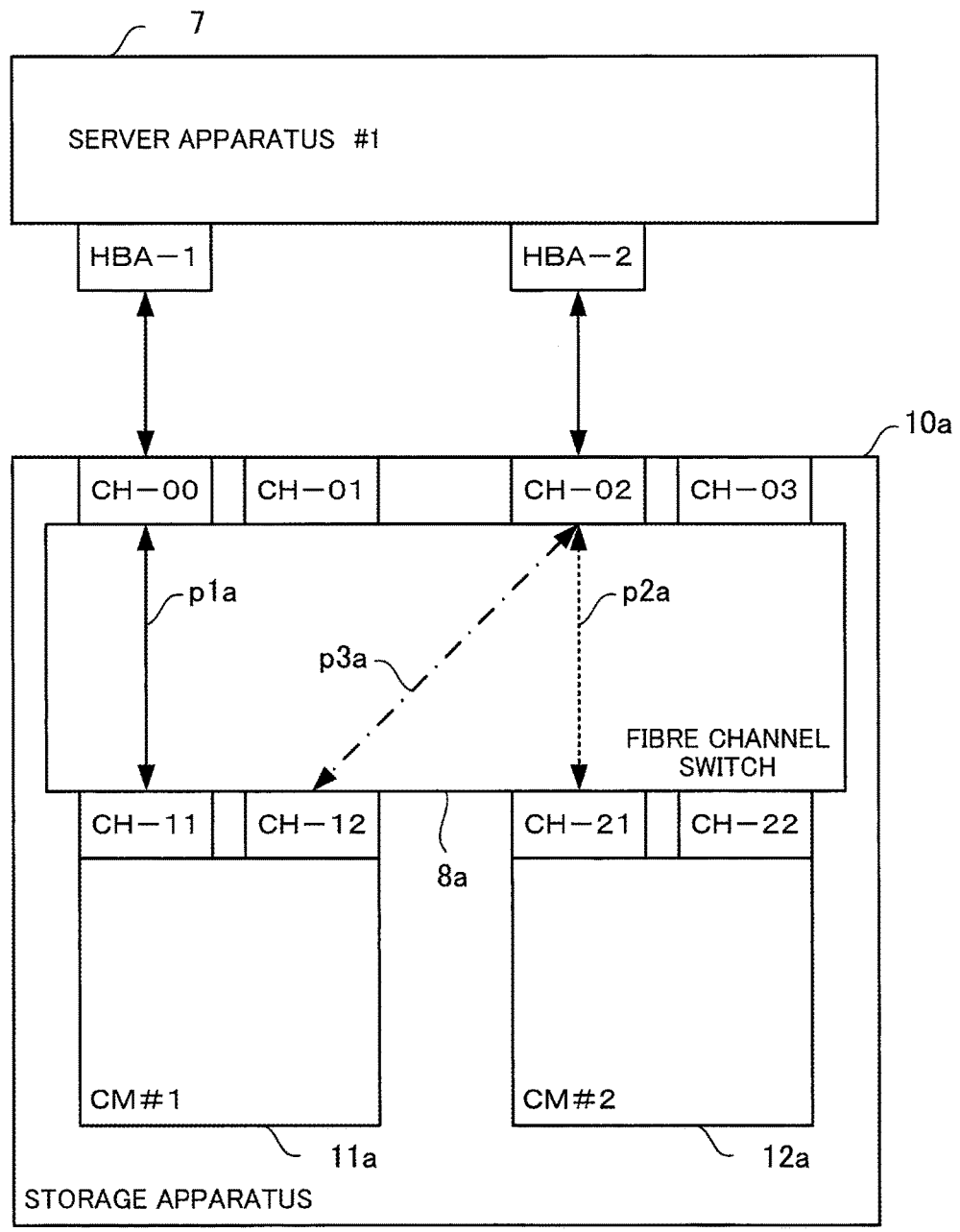
FIG. 14 depicts one example of path configuration and failure recovery in a storage system according to a third embodiment.

Next, a storage system according to a third embodiment will be described with reference to FIG. 14. The storage system according to the third embodiment differs to the storage apparatus 10 according to the second embodiment in that the storage apparatus has a fibre channel switching function. FIG. 14 depicts one example of path configuration and failure recovery in the storage system according to the third embodiment.

A storage system 6a includes the server apparatus 7 and a storage apparatus 10a. The server apparatus 7 connects to the storage apparatus 10a using FCoE. The storage apparatus 10a includes the fibre channel switch 8a and controller modules 11a and 12a, with the server apparatus 7 and the controller modules 11a and 12a being connected via the fibre channel switch 8a. The fibre channel switch 8a is capable of switching between paths that connect the server apparatus 7 and the controller modules 11a and 12a.

In the following description, to clarify the connection relationship when describing the path configuration, the server apparatus 7 is referred to as "server apparatus #1" and the interfaces of the server apparatus #1 are referred to as "HBA-1" and "HBA-2". The two controller modules 11a and 12a provided in the storage apparatus 10a are respectively referred to as "CM#1" and "CM#2". The two channel adapters of "CM#1" are respectively referred to as "CH-11" and "CH-12" and the two channel adapters of "CM#2" are respectively referred to as "CH-21" and "CH-22". The channel adapters on the server apparatus 7 side of the fibre channel switch 8a are respectively referred to as "CH-00" to "CH-03".

When CM#1 and CM#2 are operating normally, the server apparatus #1 and the storage apparatus 10a (the fibre channel switch 8a) connect HBA-1 and CH-00 and also connect HBA-2 and CH-02. The fibre channel switch 8a connects CH-00 and CH-11 and connects CH-02 and CH-21. Accordingly, the server apparatus #1 and CM#1 are connected on a path p1a that passes HBA-1, CH-00 and CH-11. The server apparatus #1 and CM#2 are connected on a path p2a that passes HBA-2, CH-02 and CH-21.

Here, when a failure has occurred at CM#2, the server apparatus #1 and CM#1 are connected on the path p3a that passes HBA-2, CH-02, and CH-12 and CM#2 is cut off from server apparatus #1.

In this way, the storage apparatus 10a may be capable of switching paths between the server apparatus 7 and the controller modules 11a and 12a using the fibre channel switch 8a. Here, the fibre channel switch 8a functions as a path switching means of the storage apparatus 10a. Since the fibre channel switch 8a includes the same functions as the fibre channel switch 8 described in the second embodiment, the storage system 6a also has the same functions as the storage system 6 described in the second embodiment.

Fourth Embodiment

Figure 15:
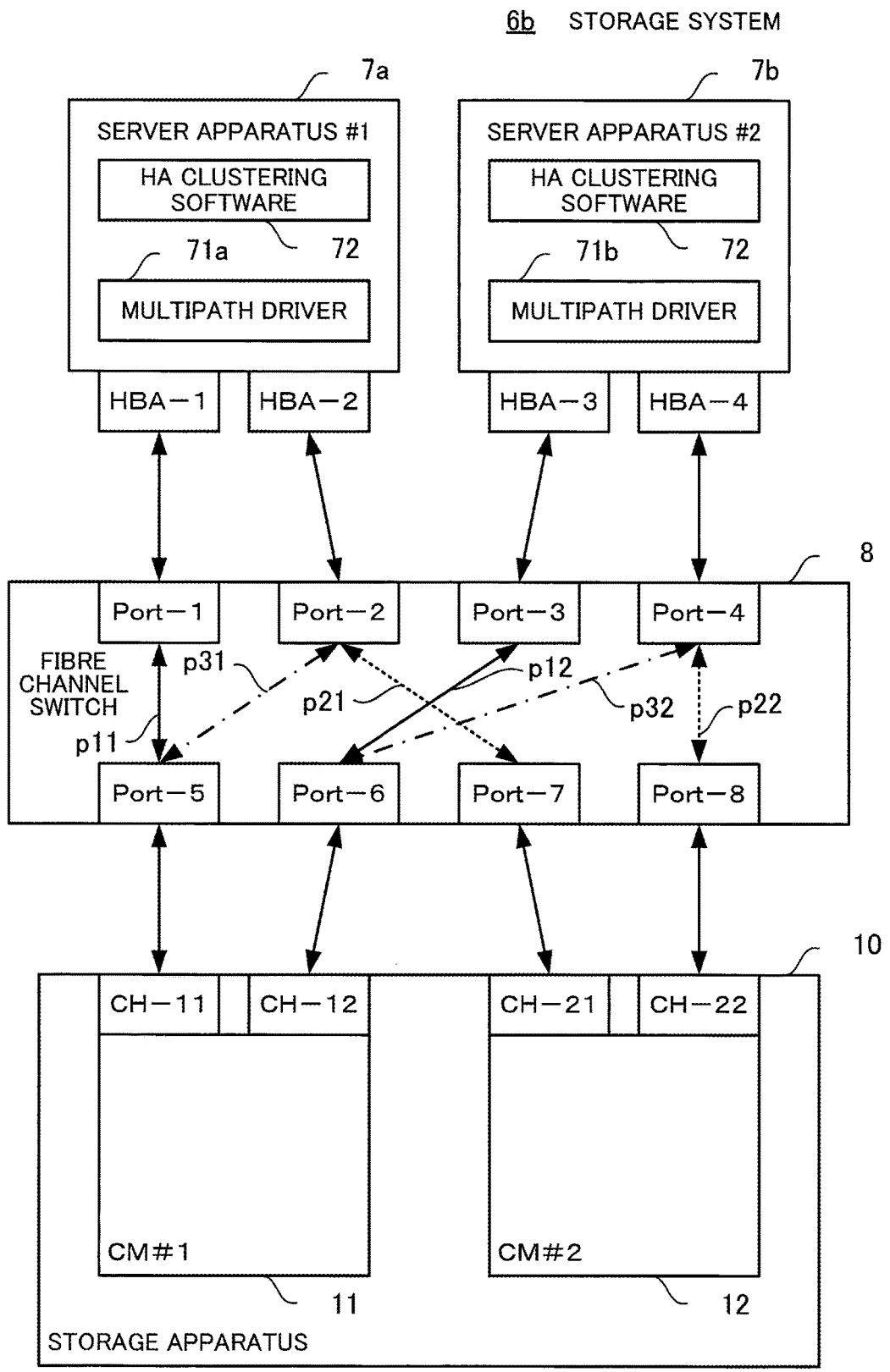
FIG. 15 depicts one example of path configuration and failure recovery of a storage system according to a fourth embodiment.

Next, a storage system according to a fourth embodiment will be described with reference to FIG. 15. The storage system according to the fourth embodiment differs to the second embodiment in that a plurality of server apparatuses are connected to a fibre channel switch. FIG. 15 depicts one example of path configuration and failure recovery of the storage system according to the fourth embodiment.

A storage system 6b includes server apparatuses 7a and 7b, the fibre channel switch 8, and the storage apparatus 10. The server apparatuses 7a and 7b connect to the storage apparatus 10 via the fibre channel switch 8 using FCoE and are capable of writing data into storage devices provided in the storage apparatus 10 and reading data from the storage devices.

The server apparatuses 7a and 7b execute HA (High Availability) clustering software 72 so as to cooperatively construct a server system with increased availability. The server apparatuses 7a and 7b respectively include multipath drivers 71a and 71b.

In the following description, to clarify the connection relationship when describing the path configuration, the server apparatus 7a is referred to as "server apparatus #1" and the interfaces of the server apparatus #1 are referred to as "HBA-1" and "HBA-2". Also, the server apparatus 7b is referred to as "server apparatus #2" and the interfaces of the server apparatus #2 are referred to as "HBA-3" and "HBA-4". Ports 82 to 89 of the fibre channel switch 8 are respectively referred to as "Port-1" to "Port-8". The two controller modules 11 and 12 provided in the storage apparatus 10 are respectively referred to as "CM#1" and "CM#2". The channel adapters 117 and 118 of CM#1 are respectively referred to as "CH-11" and "CH-12" and the channel adapters 127 and 128 of CM#2 are respectively referred to as "CH-21" and "CH-22".

The server apparatus #1 and the fibre channel switch 8 connect HBA-1 and Port-1 and connect HBA-2 and Port-2. The server apparatus #2 and the fibre channel switch 8 connect HBA-3 and Port-3 and connect HBA-4 and Port-4. CM#1 and the fibre channel switch 8 connect CH-11 and Port-5 and connect CH-2 and Port-6. CM#2 and the fibre channel switch 8 connect CH-21 and Port-7 and connect CH-2 and Port-8.

When CM#1 and CM#2 are operating normally, the fibre channel switch 8 connects Port-1 and Port-5, connects Port-2 and Port-7, connects Port-3 and Port-6, and connects Port-4 and Port-8.

Accordingly, the server apparatus #1 and CM#1 are connected on the path p11 that passes HBA-1, Port-1, Port-5, and CH-11. The server apparatus #1 and CM#2 are connected on the path p21 that passes HBA-2, Port-2, Port-7, and CH-21. The server apparatus #2 and CM#1 are connected on the path p12 that passes HBA-3, Port-3, Port-6, and CH-12. The server apparatus #2 and CM#2 are connected on the path p22 that passes HBA-4, Port-4, Port-8, and CH-22.

Here, when a failure has occurred at CM#2, in addition to the connection on the path p11, server apparatus #1 and CM#1 are connected on the path p31 that passes HBA-2, Port-2, Port-5, and CH-11. Similarly, when a failure has occurred at CM#2, in addition to the connection on the path p12, server apparatus #2 and CM#1 are connected on the path p32 that passes HBA-4, Port-4, Port-6, and CH-12. By doing so, CM#2 is cut off from server apparatus #1 and from server apparatus #2.

This storage system 6b is capable of facilitating recovery measures even when for example there is a simultaneous occurrence of a failure at CM#1 or CM#2 and a failover to server apparatus #2 that was on standby in response to a failure occurring at server apparatus #1.

That is, through failover control of access paths by the storage apparatus 10, it is possible to localize and simplify failover control for the server apparatus #1 and server apparatus #2 on the server apparatus #1 and the server apparatus #2 side. The storage system 6b that has been simplified in this way can provide high reliability.

Note that the processing functions described above can be realized by a computer. When doing so, a program in which the processing content of the functions to be provided by the storage control apparatuses 4 and 4d, the storage apparatuses 2, 10, and 10a, the controller modules 11, 12, 11a, and 12a, and the fibre channel switches 8 and 8a is written is provided. By having the program executed by a computer, the processing functions described above are realized by the computer. A program in which the processing content is written can be recorded on a computer-readable recording medium. A magnetic storage apparatus, an optical disc, a magneto-optical recording medium, and a semiconductor memory can be given as examples of a computer-readable recording medium. The magnetic storage apparatus may be a hard disk drive, a flexible disk, or a magnetic tape. DVD (Digital Versatile Disc), DVD-RAM, CD-ROM (Read Only Memory), and CD-RW (Rewritable) are all examples of optical discs. An MO (Magneto-Optical) disc is one example of a magneto-optical recording medium.

When the program is distributed, as one example portable recording media such as DVDs or CD-ROMs on which the program is recorded may be sold. It is also possible to store the program in a storage apparatus of a server computer and to transfer the program from the server computer via a network to another computer.

For example, the computer that executes the program stores the program recorded on a portable recording medium or the program transferred from a server computer into its own storage apparatus. The computer reads the program from its own storage apparatus and executes processing in accordance with the program. Note that the computer is also capable of directly reading the program from the portable recording medium and executing processing in accordance with the program. It is also possible for a computer to execute processing in accordance with a received program every time a program is transferred from a server computer connected via a network.

At least part of the processing functions described above can be realized by electronic circuits such as a DSP, an ASIC, and a PLD.

According to the present embodiments, it is possible to limit the influence of a broken path due to a restart of a redundantly provided storage control apparatus.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage control apparatus that connects on a first path to a first port of a server apparatus via a switch and shares a load of access control from the server apparatus to a storage apparatus with a redundant storage control apparatus that connects on a second path to a second port of the server apparatus via the switch, the storage control apparatus comprising:
   a memory storing path connection information relating to a connection between the server apparatus and the storage control apparatus at the switch and a connection between the server apparatus and the redundant storage control apparatus at the switch; and
   a processor configured to perform a procedure including:
   switching, when a restart condition of the redundant storage control apparatus has been detected, the second port from being connected at the switch to the redundant storage control apparatus that is connected on the second path to being connected to the storage control apparatus that is connected on a third path based on the path connection information, and then instructing the redundant storage control apparatus to restart.

2. The storage control apparatus according to claim 1, wherein the switch switches paths based on the path connection information which is held by the switch, and
   the procedure further includes updating the path connection information when the restart condition of the redundant storage control apparatus has been detected.

3. The storage control apparatus according to claim 2, wherein the procedure further includes updating the path connection information at a time of detection of an error at the redundant storage control apparatus.

4. The storage control apparatus according to claim 2, wherein the procedure further includes updating the path connection information at a time of a restart request for the redundant storage control apparatus and permitting the restart request for the redundant storage control apparatus after confirming path switching based on the path connection information.

5. The storage control apparatus according to claim 4, wherein the procedure further includes updating the path connection information at a time of completion of a restart of the redundant storage control apparatus and switching, based on the path connection information, the second port from being connected at the switch to the storage control apparatus using the third path to being connected to the redundant storage control apparatus using the second path.

6. The storage control apparatus according to claim 1, wherein the processor includes a first processor that is subjected to a restart and a second processor that is not subjected to a restart and monitors the first processor.

7. A non-transitory computer-readable storage medium storing a storage control program, which is executed by a computer provided in a storage control apparatus that connects on a first path to a first port of a server apparatus via a switch and shares a load of access control from the server apparatus to a storage apparatus with a redundant storage control apparatus that connects on a second path to a second port of the server apparatus via the switch,
   the storage control program causing the computer to execute a procedure comprising switching, when a restart condition of the redundant storage control apparatus has been detected, the second port from being connected at the switch to the redundant storage control apparatus that is connected on the second path to being connected to the storage control apparatus that is connected on a third path based on path connection information relating to a connection between the server apparatus and the storage control apparatus at the switch and a connection between the server apparatus and the redundant storage control apparatus at the switch, and then instructing the redundant storage control apparatus to restart.

8. A storage control method, which is executed by a computer provided in a storage control apparatus that connects on a first path to a first port of a server apparatus via a switch and shares a load of access control from the server apparatus to a storage apparatus with a redundant storage control apparatus that connects on a second path to a second port of the server apparatus via the switch, the computer executing a procedure comprising switching, when a restart condition of the redundant storage control apparatus has been detected, the second port from being connected at the switch to the redundant storage control apparatus that is connected on the second path to being connected to the storage control apparatus that is connected on a third path based on path connection information relating to a connection between the server apparatus and the storage control apparatus at the switch and a connection between the server apparatus and the redundant storage control apparatus at the switch, and then instructing the redundant storage control apparatus to restart.

\* \* \* \* \*